United States Patent [19]

Mehrotra

[11] Patent Number: 4,994,421

[45] Date of Patent: Feb. 19, 1991

[54] ELECTRO-OPTICAL POLYCRYSTALLINE BARIUM LANTHANUM TITANIUM NIOBATE

[75] Inventor: Arun K. Mehrotra, Rochester, N.Y.

[73] Assignee: Eastman Kodak Company, Rochester, N.Y.

[21] Appl. No.: 278,994

[22] Filed: Dec. 2, 1988

[51] Int. Cl.$^5$ .................. C04B 35/46; C04B 35/50
[52] U.S. Cl. ................................ 501/139; 252/62.9; 264/65
[58] Field of Search ............... 501/139; 252/62.9 R; 264/65

[56] References Cited

U.S. PATENT DOCUMENTS

| | | | |
|---|---|---|---|
| 3,764,529 | 10/1973 | Matsuo et al. ................ | 501/139 |
| 4,229,095 | 10/1980 | Mir . | |
| 4,675,123 | 6/1987 | Tsutomu et al. . | |
| 4,726,099 | 2/1988 | Card et al. . | |

FOREIGN PATENT DOCUMENTS

| | | | |
|---|---|---|---|
| 3219557 | 6/1985 | Fed. Rep. of Germany . | |
| 2077253 | 12/1981 | United Kingdom ................ | 501/139 |

OTHER PUBLICATIONS

Gutu-Nelle, Electrical Communication, Transparent Ceramics for Electro-Optical Applications, 1982, pp. 171-174.

Gutu-Nelle, Ferroelectrics, New Transparent Ceramics for Electro-Optical Applications, 1983, pp. 151-156.

*Primary Examiner*—William R. Dixon, Jr.
*Assistant Examiner*—David M. Brunsman
*Attorney, Agent, or Firm*—Paul A. Leipold

[57] ABSTRACT

In accordance with the process of the invention, there is formed electro-optical, barium lanthanum titanium niobate having a general uniform grain size of about 2 to about 20 microns. This material is formed using a raw material that comprises commercially available oxided particles of lanthanum, titanium, and niobium and carbonate of barium. The particles are calcined and then sintered under pressure, heat, and vacuumed to form a sintered mass. The mass is cooled in a controlled manner and then sliced to form wafers. The wafers are then heated in an oxidizing atmosphere to form the transparent electro-optical materials.

19 Claims, No Drawings

ELECTRO-OPTICAL POLYCRYSTALLINE BARIUM LANTHANUM TITANIUM NIOBATE

FIELD OF THE INVENTION

The invention relates to barium lanthanum titanium niobate polycrystalline structures, and processes of forming such polycrystalline materials.

PRIOR ART

In the optical information technique for copying machines, rapid printers and similar items, working materials and arrangements are needed, the optical transparency of which can be modified in a targeted and rapid manner.

Fundamentally this can take place by means of an arrangement which consists of a transparent plate, the birefringence of which can be changed and which is located between two polarizers having directions of polarization perpendicular to one another. Modifications of the birefringence are preferentially obtained, when an optically isotropic, and therewith optically passive, working material in the field free state can be induced to become anisotropic in an electrical field application and thus and only then becomes birefringent. Especially suited for this purpose are ferro electric working materials. The modification of the birefringence leads to intensity changes of the light beams passing through the arrangement for certain applications. This modification of birefringence should be reversible with electric field.

So that the ratio of the light strengths between the switched on (with birefringence) and the switched off state (without birefringence) is as large as possible, the losses in transmission have to be kept as small as possible. Losses in transmission are the result of reflection at the interior and exterior surfaces, as well as the result of light refraction at the grain limits of the working material. Monocrystals do not exhibit either interior surfaces nor grain limits (boundaries); however, their manufacture is too costly and cumbersome For most of the purposes of application. Interior surfaces occur in the case of porous working materials, and for this reason, a working material is required which is as dense as possible. To light refraction takes place at grain boundaries if the same optical conditions prevail on both sides. This condition is generally met only in the case when the working material turns out to be isotropic even in the microscopic state.

U.S. Pat. No. 4,229,095 discloses various embodiments of electronic color imaging apparatus that utilize arrays of separately addressable, pixel (picture element) sized, electro optical means to effect multicolor exposure of panchromatic imaging media. One preferred kind of electro optical means disclosed in that patent is a light valve comprising a panel of ferro electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of &he plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green, and blue exposing sources and according to the red, green, and blue color information for the pixels of that image.

For rapid optical switches, working materials are required in which the applied, electrical fields can be switched on and off by means of the smallest possible currents. To this end it is desirable to have a slim hysteresis curve on the one hand and a low dielectric constant on the other hand.

In U.S. Pat. No. 4,675,123 (Tsunooka et al) and U.S. Pat. No. 4,726,099 (Card et al) it has been generally disclosed that piezoelectric materials may be formulated using a variety of materials including lanthanum, barium, titanium, and niobium.

It has been disclosed in an article in Ferroelectrics, 1983, Vol. 49, pages 151-156, entitled "New Transparent Ceramics For Electro-Optical Applications" by A. Gutu Nelle et al that transparent electro optic ceramics have been prepared from barium lanthsnum titanium and niobium oxides. It is disclosed that these materials have electro-optical properties. The materials formed by Gutu Nelle et al were light gray with mixtures of small (less than 2 micron grains and larger grains).

German Patent 3,219,557 (Gutu Nelle et al) discloses electro optical active barium lanthanum titanium and niobium ceramics.

While the materials of Gutu Nelle et al patent were electro optical, they suffered the disadvantage of having mixed grain sizes and, therefore, the light transmission ability was not uniform and scattering took place. Further forming the raw materials by chemical formation from liquids, the raw materials were expensive, thereby causing the finished products to be expensive, as well as not uniform.

Therefore, there remains a need for an optical waveguide of barium lanthanum titanium niobate that is highly transparent, non light-scattering, and lower in cost.

THE INVENTION

In accordance with the process of the invention, there is formed a transparent, electro-optical, barium lanthanum titanium niobate having a general uniform grain size of between about 2 and 20 microns. This material is formed using a raw material that comprises commercially available oxide particles of lanthanum, titanium, and niobium and carbonate of barium. The particles are calcined and then sintered under pressure, heat, and vacuum to form a sintered mass. The mass is cooled in a controlled manner and then sliced to form wafers. The wafers are then heated in an oxidizing atmosphere to form the transparent electro optical materials.

MODES OF PERFORMING THE INVENTION

The invention has many advantages over prior materials and processes. The starting materials are low cost, commercially available oxide powders. The electro optical materials, retrieved after the completion of the processing are of uniform grain size, low porosity, high light transmission and low in light scattering. The process is low in cost as compared to processes using chemical formation of the starting materials. Chemical formation is the formation of materials from solutions of dissolved oxides. These and other advantages will be apparent from the description below. The uniform small grain size of the invention also results in improved electro optical behavior. Large grains behave differently than small ones and induce additional light scattering. Stresses between grains of different size result in grain boundary fracture, and non-uniformity in its electro optic behavior when small modulators are defined on the material.

The process of the invention results in a sintered transparent barium lanthanum titanium niobate of density greater than 99% with a uniform small grain size. The process involves mixing commercially available starting materials which are barium carbonate, lanthanum oxide, titanium oxide, and niobium oxide. The starting materials are mixed and milled prior to article formation. The mixing may be carried out in a ball mill with zirconia balls in a liquid such as isopropyl alcohol. After mixing, the material is sieved through a mesh screen and precalcined. After precalcining the materials are, again, ball milled and calcined. By this process a single phase material is obtained which is again ball milled, dried, and sieved.

The single phase material is then isostatically compacted at high pressure, such as 207,000 kpa. The isostatically pressed compact is sintered at a temperature of between about 1200° C. and about 1300° C. with a pressure of between about 8,000 kpa and 17,000 kPa in a vacuum of about $10^{-3}$ torr. A black dense material is obtained. The black color indicates that the material is at least partially reduced. The black dense material is then sliced into wafers and polished. The wafers are then heated in air at a temperature lower than the sintering temperature to obtain a transparent polycrystalline ceramic.

The structure of the barium lanthanum titanium niobate may be any structure that will provide a transparent electro optical material and have a generally tungsten bronze structure. The materials of the invention generally have a formula of $Ba_{6-1.5x}La_xNb_8Ti_2O_{30}$. X has a range between 0.01 and 0.3. The preferred materials have been found to be a BLTN composition having the typical composition of $Ba_{5.7}$, $La_{0.2}$, $Ti_2$, $Nb_8$, and $O_{30}$, as this composition gives a transparent material with good light transmission and electro-optical properties.

The grain size of the transparent bodies of the invention may be any suitable uniform small grain size that results in good electro-optical properties. Suitable grain sizes are those where substantially all the grains are between about 2 and about 20 microns. The preferred grain size has been found to be with at least 75% of the grains of a size between about 5 and about 12 microns and substantially all grains between about 2 and about 20 microns for good light transmission and electro-optical properties. The optimum grain size has been found to be a product with greater than 75% of the grains between about 6 and about 8 microns for a most uniform product with best optical properties.

The isostatic pressure used in forming the preform prior to hot pressing and heating may be any suitable pressure and generally would be between about 138,000 and about 240,000 kpa. The preferred hot pressure is between about 8,000 and 17,000 kpa for uniform and dense product. The hot pressed material is heated to between about 1200° C. and 1300° C. A most preferred pressure and heating temperature has been found to be about 14,000 kPa and about 1250° C. for producing a uniform material. The time of heating is selected to give a partial reduction of the material to form a black dense material. At 1250° C., 20 hours have been found to be suitable.

The vacuum utilized during hot pressing and heating may be any amount that will result in a black dense uniform grain size. A preferred amount of vacuum has been found to be between $10^{-4}$ and about $10^{-3}$ torr to give dense small grain product with low porosity. A greater vacuum may lead to a metallic conversion, while a poorer vacuum leads to grain growth. After hot pressing the material, it is cooled at a controlled rate of about 100° C. per hour to provide cooling without any internal strain that could cause cracking of the piece.

The black dense sintered piece is sliced into wafers that are of any suitable thickness that may be oxidized completely in a reasonable time period when reheated. Generally a thickness range between about 100 and 500 microns is suitable; the preferred range is between about 250 and 350 microns for strong, thin, transparent, optically sensitive materials. The temperature that the wafers are heated to during oxidizing may be in any temperature that is below the sintering temperature and is high enough to provide a transparent character to the wafers without deformation or further crystal growth. Suitable temperatures have been found to be between about 1000° C. and 1050° C.

The following examples are provided as illustrative and not exhaustive of the possibilities of the invention. Parts and percentages are by weight unless otherwise indicated.

EXAMPLE I (Control)

Barium carbonate, lanthanum oxide, titanium oxide, and niobium oxide were mixed in required proportions for the BLTN composition of $Ba_{5.7}La_{0.2}Ti_2Nb_8O_{30}$. Mixing was carried out in a ball mill with zirconia balls and isopropyl alcohol for 10 hours. The material was then dried and sieved through a 100 mesh screen and precalcined at 1050° C. for 15 hours. After this the material was again balled milled according to the procedure described above and was calcined at 1100° C. for 15 hours, and a single phase material was obtained. This was again ball milled, dried, and sieved through a 100 mesh screen. Green compacts were made in an isostatic press at 205,000 kpa.

The compact was hot pressed in air at 1200° C. for 20 hours. The microstructure showed fine grain structure with porosity. A new green compact was then hot pressed in air at 1300° C. for 20 hours, and the microstructure showed porosity of greater than one percent and also areas of exaggerated grain growth.

The material is sliced into wafers of about 300 microns thick. The material transmits less than 50% of light at a wavelength of about 600 nm.

EXAMPLE II

The processing up to the isostatically pressed compact was the same as in Example I. Hot pressing, however, was done at 1250° C. for 20 hours about 14,000 kpa in a vacuum of $10^{-3}$ torr. A black dense material was obtained. It was then sliced into wafers about 300 μm thick and polished. These wafers were annealed in air at 1000° C. for ½ hour to obtain transparent polycrystalline ceramic. The microstructure of vacuum sintered material and annealed material showed uniform grain size (greater than 75% 6-8 μm) with negligible porosity (99.5% dense).

The material passed more than 60% of the light at a wavelength of about 600 nm.

The specification and Example are intended to be illustrative and not exhaustive of possibilities of the invention. There are other variations of the invention that will be apparent to those skilled in the art. For instance, while described utilizing commercially available metal oxides as starting material, it is also possible that chemically formed oxides could be utilized as the starting materials, although this would increase the cost of the process. This variation and others are intended to be within the scope of the invention that is only intended to be limited by the scope of the claims attached hereto.

I claim:

1. A transparent electro-optic article comprised of a barium lanthanum titanium niobate wherein substantially all grains are of a grain size between about 2 and about 20 microns, said article has a pore volume of less than about 1 percent, and said article has a grain size of between about 2 and about 20 microns.

2. An article of claim 1 wherein 75% of said grains are between about 6 and 8 microns.

3. The article of claim 1 wherein said article has the formula $Ba_{5.7}La_{0.2}Ti_2Nb_8O_{30}$.

4. The article of claim 1 with a pore volume of less than 0.5 percent.

5. The article of claim 1 wherein said article passes greater than 50 percent of light at a wavelength of 600 nm.

6. The article of claim 1 wherein greater than 85% of said grains have a grain size between about 5 and about 12 microns.

7. A method of forming transparent electro-optical barium lanthanum titanium niobate comprising
providing particles of barium carbonate, lanthanum oxide, titanium oxide, and niobium oxide,
calcining said particles,
sintering the calcined particles at a temperature of between about 1200° C. and 1300° C., and a vacuum of between about $10^{-3}$ and $10^{-4}$ torr while under pressure to form a sintered mass,
cooling said sintered mass,
slicing said mass to form wafers,
heating said wafers in an oxidizing atmosphere.

8. The method of claim 7 wherein said wafers are about 300 microns in thickness.

9. The method of claim 7 wherein said wafers are up to about 600 microns in thickness.

10. The method of claim 7 wherein said wafers are polished prior to oxidizing treatment.

11. The method of claim 7 wherein said sintering is carried out at a temperature of about 1250° C.

12. The method of claim 7 wherein isostatic pressure during preform formation after calcining and before sintering is between about 138,000 and about 240,000 kpa.

13. The method of claim 7 wherein said pressure during sintering is between about 8,000 and about 17,000 kpa.

14. The method of claim 7 wherein said slicing to form wafers results in wafers having a thickness range of between about 250 and about 350 microns.

15. The method of claim 7 wherein said calcining is in an oxidizing atmosphere is at a temperature of between about 1000° C. and about 1050° C.

16. The method of claim 7 wherein said electro-optical niobate has substantially all grains between about 2 and about 20 microns.

17. The method of claim 16 wherein greater than 75% of said grains are between about 5 and about 12 microns.

18. The method of claim 7 wherein said niobate comprises $Ba_{5.7}La_{0.2}Ti_2Nb_8O_{30}$.

19. The method of claim 10 wherein said heating said wafers is an oxidizing atmosphere is at between about 1000° C. and 1050° C.

* * * * *

UNITED STATES PATENT AND TRADEMARK OFFICE
CERTIFICATE OF CORRECTION

PATENT NO. : 4,994,421

DATED : February 19, 1991

INVENTOR(S) : Arun K. Mehrotra

It is certified that error appears in the above-identified patent and that said Letters Patent is hereby corrected as shown below:

In Column 5, line 33, delete "85%" and insert --75%--.

Signed and Sealed this

Twenty-first Day of July, 1992

Attest:

DOUGLAS B. COMER

*Attesting Officer*   *Acting Commissioner of Patents and Trademarks*